United States Patent
Iwai et al.

(10) Patent No.: US 6,236,910 B1
(45) Date of Patent: May 22, 2001

(54) VEHICLE CONTROL APPARATUS HAVING PROGRAMS OF OBJECT-ORIENTED DESIGN

(75) Inventors: Akihito Iwai, Chiryu; Shigeru Kajioka, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/352,195

(22) Filed: Jul. 13, 1999

(30) Foreign Application Priority Data

Sep. 17, 1998 (JP) .................................................. 10-263476

(51) Int. Cl.⁷ ...................................................... G06G 7/70
(52) U.S. Cl. ............................ 701/1; 701/102; 701/103; 701/104; 123/480; 123/492; 123/673; 123/440
(58) Field of Search ............................... 701/1, 104, 102, 701/115; 123/480, 440

(56) References Cited

U.S. PATENT DOCUMENTS

| 4,345,561 | * | 8/1982 | Kondo et al. ........................ 123/440 |
| 4,556,943 | * | 12/1985 | Pauwels et al. ...................... 701/115 |
| 4,964,050 | * | 10/1990 | Yakuwa et al. ...................... 701/102 |
| 5,490,064 | | 2/1996 | Minowa . |
| 5,572,977 | * | 11/1996 | Shibata et al. ....................... 123/480 |
| 5,586,034 | * | 12/1996 | Takaba et al. ....................... 701/102 |
| 5,908,463 | * | 6/1999 | Akazaki et al. ..................... 701/104 |
| 6,016,795 | * | 1/2000 | Ohki .................................... 123/681 |
| 6,067,965 | * | 5/2000 | Trumpy et al. ...................... 123/480 |

FOREIGN PATENT DOCUMENTS 7-277105    10/1995    (JP) .

* cited by examiner

Primary Examiner—William A. Cuchlinski, Jr.
Assistant Examiner—Tuan C To
(74) Attorney, Agent, or Firm—Nixon & Vanderhye P.C.

(57) ABSTRACT

An engine control program is divided into an application layer and a platform layer. The application layer defines a program which is independent of a hardware and is provided under an object-oriented design. The platform layer defines a program which is dependent on the hardware and is provided under the object-oriented design, and divided into three layers, that is, an upper layer, an intermediate layer and a lower layer. The upper layer, intermediate layer and the lower layer includes a sensor/actuator layer, a device driver layer and a virtual MPU layer, respectively.

11 Claims, 9 Drawing Sheets

VEHICLE CONTROL APPARATUS HAVING PROGRAMS OF OBJECT-ORIENTED DESIGN

CROSS REFERENCE TO RELATED APPLICATION

This application relates to and incorporates herein by reference Japanese Patent Application No. 10-263476 filed on Sep. 17, 1998.

BACKGROUND OF THE INVENTION

1. Field of the Invention

The present invention relates to a control apparatus for vehicles. More specifically, the present invention relates to a control apparatus for vehicles which is capable of reducing greatly program development workload to enhance reusability of software even when hardware parts such as sensors, actuators, driving circuits and a microcomputer are changed, by providing a control program in layered form and adopting an object-oriented design method.

2. Related Art

Figure 9A:
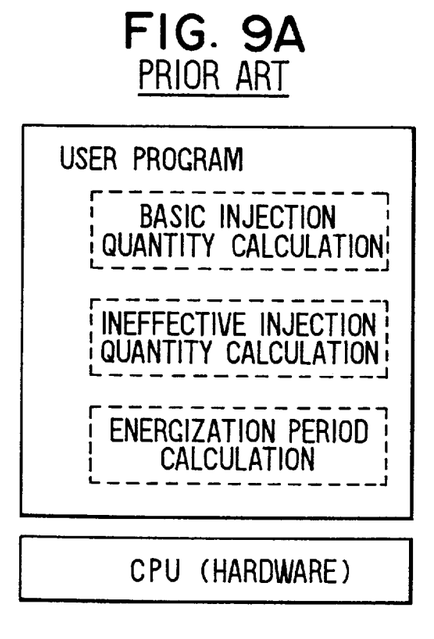
FIGS. 9A and 9B are explanatory diagrams showing an exemplary software of a conventional control apparatus for vehicles.
Figure 9B:
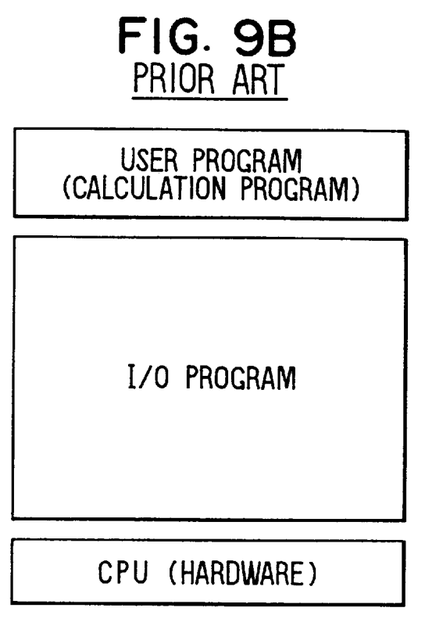

A conventional control apparatus for vehicles has software or programs as shown in FIGS. 9A and 9B. The software of the control apparatus defines a sequence of programs along a flow of processing as shown in FIG. 9A, based on the intended processing such as fuel injection processing. Specifically, in a fuel injection control program for engine control, the program is constructed in the following manner, for instance, based on a sequence of processing for injecting fuel in a quantity most optimum to the present engine conditions.

That is, as shown in FIG. 9A, in a user program including an I/O program for controlling a CPU (hardware), a base routine is executed. In the base routine, a basic injection quantity is calculated to match the present operating condition based on parameters such as an engine rotation speed (basic injection quantity calculation), a basic energization time period for an injector driving circuit is calculated in correspondence with the basic injection quantity, an ineffective injection time period dependent on the hardware characteristics of the injector (fuel injection valve) is calculated (ineffective injection quantity calculation), and a final energization time period for the injector driving circuit is calculated (enrgization time period calculation) by adding the ineffective injection time period to the basic energization time period. Fuel injection is effected during the energization time period in an interrupt routine executed at every predetermined engine rotation position (crankshaft rotation position).

It is required in designing the sequence of programs to define in order the sequence of processing covering calculation of the basic injection quantity, addition of the ineffective injection period and execution of the injector energization, while taking into account the hardware characteristics of the microcomputer, sensors, injectors and the like. If the program is required to be changed partly, not only the corresponding program parts must be changed but also other program part must be checked and changed if necessary. As a result, the control program cannot be reused for other types of engines.

What is, when the basic injection quantity operation program is to be changed, the ineffective injection quantity operation program and the energization period operation program has to be checked and changed as well because the end of the program is not clear. Further, when the CPU has been changed, the entire user program has to be checked.

Thus, each time hardware is to be changed, it is required to define the sequence of program almost anew. Further, a programmer himself has to understand the program content of processing which is dependent on the hardware in addition to the control content and calculation method. As a result, the program development workload becomes enormous. This is described in further detail with respect to changing an injector, for instance, as the hardware.

Figure 10:
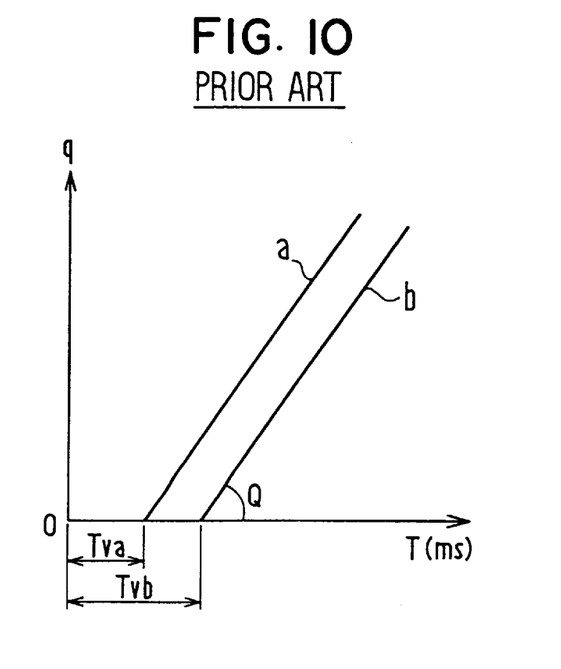
FIG. 10 is a characteristics diagram showing injection quantity of a general injector.

An injector has an injection quantity characteristics shown in FIG. 10 in which the abscissa and the ordinate indicate the energization period T (ms) and the dynamic injection quantity (q), respectively. Here, the dynamic injection quantity means the injection quantity for a certain energization period, and a static injection quantity (Q) means the injection quantity injected for a unit time period when a needle valve is maintained at a maximum lift position under a specified pressure. Further, the ineffective injection period (Tva, Tvb) means a delay in time from the start of energizing the injector to the actual opening of the needle valve.

The injection quantity generally depends on the stroke of a needle valve, area of an injection hole, difference between injection point pressure and fuel pressure. Once those parameters are determined, the injection quantity depends on the opening period of the needle valve, that is, the energization period of the solenoid coil. Therefore, as shown in FIG. 10, the characteristics have linearity over a certain range of the energization period. Its inclination is indicated by the static injection quantity Q.

Provided that one injector a having characteristics a is changed to another injector b having characteristics b, the ineffective injection period changes from Tva to Tvb as shown. This results from variations in mechanical factors (that is, hardware characteristics) such as the stroke, injection hole and the like of injectors among the above parameters.

Thus, even when injector a is to be changed to injector b without any changes in the engine control apparatus (that is, even when no changes are made to the fuel injection quantity operation program), changes in the ineffective injection period are required to be compensated for in correspondence with the change of injectors. That is, it is required to check the entire operation program and change corresponding sections (in this instance, sections related to the ineffective injection period).

One solution for the above problem is proposed in JPA-7-277105, for instance. In this solution, as shown in FIG. 9B, an I/O program for processing input and output of a CPU (hardware) and a user program (operation program) for executing control calculation are provided separately to be independent from each other. Thus, the control software development workload is reduced by changing only the I/O program without changing operation program at the time of changing hardware.

According to this prior art, however, although the workload of developing the operation program section which is not required to be changed, the entire I/O program is required to be checked and the development workload still becomes enormous even if the change is only on a part of the driving circuit. This is because, the I/O program defines in sequence programs for the sensors, actuators, driving circuit and the like, even if the change is only on the part of the driving circuit (for instance, only on a motor driving circuit).

Each actual control apparatus for vehicles has a plurality of hardware (electronic component parts) such as a microcomputer, driving ICs for driving actuators, A/D converters as one of the input circuits, and the like. The life cycle of each hardware differs from one to another depending on its performance and cost. As a result, each time a new control apparatus for vehicles is developed, a change is required necessarily to be made on a part of hardware which constitutes the control apparatus. Thus, even in the proposed prior art improvement of FIG. 9B, a large program change is necessitated each time the control apparatus for vehicles is changed.

Further, in the above prior art, only a change to the CPU (hardware) of the control apparatus for vehicles is considered. Therefore, when actuators such as an injector and sensors such as a coolant temperature sensor are changed, the operation program is still required to be changed.

SUMMARY OF THE INVENTION

The present invention has an object to reduce a program development workload and to improve the reusability of software, by reducing, in consideration of an entire control system for vehicles, as much as possible the number of program changes required in correspondence with changes in part of the system hardware such as sensors, actuators and driving circuits.

According to the present invention, a program is divided into a first layer independent of hardware and a second layer dependent on the hardware. The second layer has a program made under an object-oriented design to define by modeling characteristics and operations of hardware such as sensors. Changes to the program in the second layer can be reduced greatly even when only the sensors and actuators are changed. Modeling in the object-oriented designing method is simplified because it is common in converting electric signals to physical quantities.

Further, the second layer is divided into an upper layer to be applied to the sensors or actuators, an intermediate layer to be applied to an input circuit or a driving circuit, and a lower layer to be applied to a microcomputer. Thus, the program can be structured to match with the life cycle of component parts which provides an entire control system for vehicles, and the program changes in the second layer can be reduced greatly.

The reusability of software can be improved greatly, because the development workload for the program changes can be reduced greatly.

BRIEF DESCRIPTION OF THE DRAWINGS

The above and other objects of the present invention will become more apparent from the following detailed description made with reference to the accompanying drawings. In the drawings.

DETAILED DESCRIPTION OF THE PREFERRED EMBODIMENT

An engine control apparatus according to an embodiment of the present invention is described below with reference to the drawings.

Figure 1:
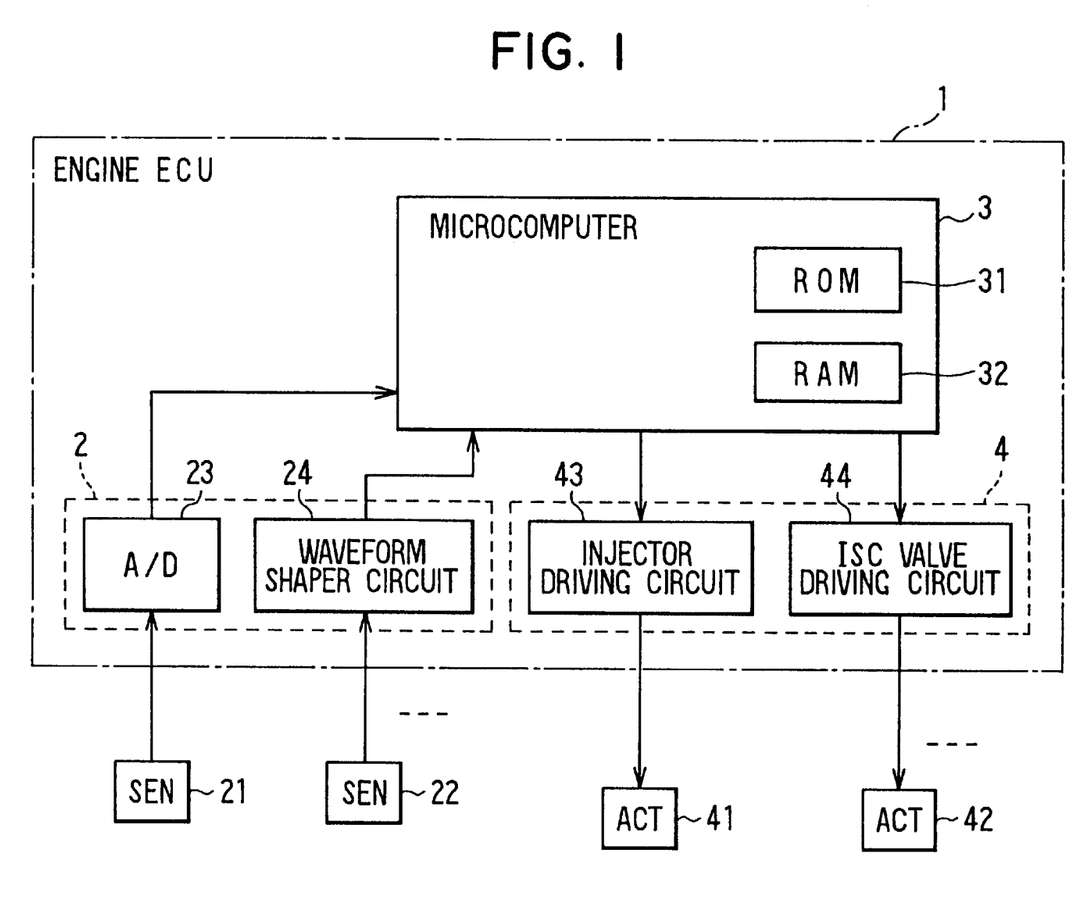
FIG. 1 is a block diagram showing a hardware construction of an engine control unit and its peripheral parts.

Referring to FIG. 1 showing an engine control system including its peripheral hardware construction, an engine control unit (ECU) 1 is constructed with an input circuit 2, a microcomputer 3 and an output circuit 4.

The input circuit 2 is constructed with an A/D converter 23, a waveform shaper circuit 24 and the like, which receive detection signals from various sensors such as a coolant temperature sensor 21 for detecting engine coolant temperature, a crank angle sensor 22 for detecting engine rotation speed, and the like. The microcomputer 3 calculates an optimum control values for an engine based on the detection signals from the input circuit 2, and produces driving signals for driving the output circuit 4 based on its calculation result. Further, the microcomputer 3 has a ROM 31 for storing the calculation program and reference data, and a RAM 32 for temporarily storing the calculation result.

The output circuit 4 is constructed with an injector driving circuit 43, ISC valve driving circuit 44 and the like for driving actuators such as an injector 4, an idle speed control (ICS) valve 42 and the like.

An engine control program which is a feature of this embodiment is programmed by the use of "object-oriented designing" method. The object-oriented designing models each part as a basic unit and defines the processing by way of its behavior (operation), as opposed to conventional software which is directed to intended processing (for instance, fuel injection processing).

This basic unit is called an object, and the program defines this object as a minimum constituent unit. The objects are coupled with each other by requests and responses (messages) in the entire program, so that a sequence of processing is executed. The object is defined as an integrated form of data (attribute) and procedure (method) of processing data. A method is executed when one object receives a request (message) from another object. The request of operation to an object is executed only through a method, and direct access to the data within the object is prohibited.

Figure 2:
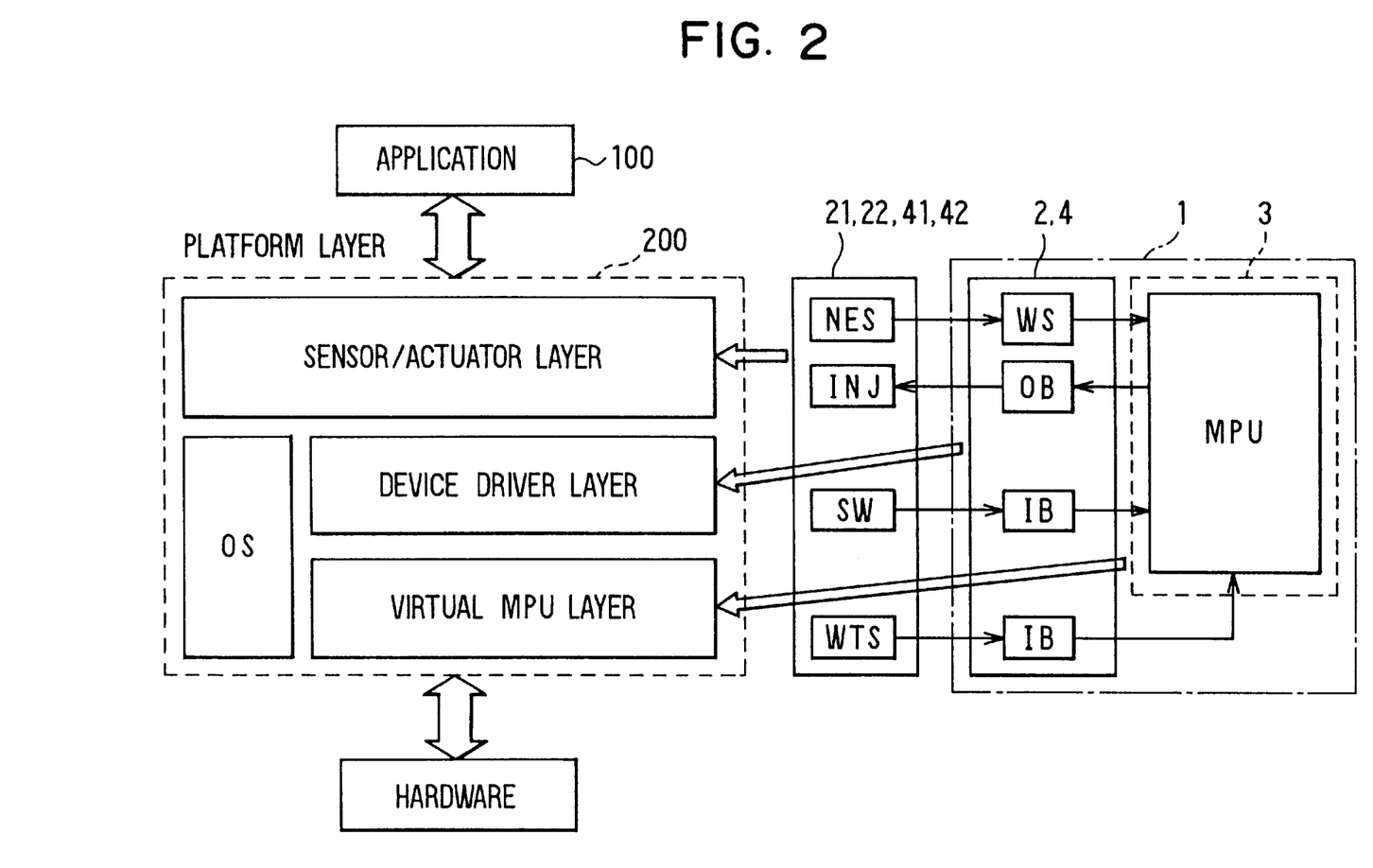
FIG. 2 is an explanatory diagram showing a basic concept of a control apparatus for vehicles according to the present invention.

FIG. 2 is an explanatory diagram showing a basic concept of the control apparatus for vehicles. Although described in detail with reference to FIGS. 3 and 4, an engine control program is constructed with two layers, that is, with an application layer and a platform layer. The platform layer is constructed with a sensor/actuator layer (210 in FIG. 3), a device driver layer (220 in FIG. 3), and a virtual MPU layer (230 in FIG. 3). The sensor/actuator layer includes various objects which define the characteristics and behaviors (operations) of the sensors and actuators (21, 22, 41 and 42 in FIG. 1) by modeling the same. The device driver layer includes various objects which defines the characteristics and operations of the input circuit and output circuit (2, 4 in FIG. 1) by modeling the same. The virtual MPU layer includes an object which defines the characteristics and operations of the microcomputer by modeling the same.

Therefore, only the program in the virtual MPU layer need be changed when the microcomputer 1 is to be changed. As no other programs in the sensor/actuator layer and the device driver layer need be changed, the other programs are not influenced. That is, as the features in the behavior of the microcomputer are provided in the virtual MPU layer, only the virtual MPU layer need be changed when the microcomputer is changed. No other programs need be changed in the device driver layer defining the behavior of the driving circuit and in the sensor/actuator layer defining the behaviors of the sensors and actuators.

In the figure, WS, OB, IB, NES, INJ, SW and WTS designate a waveform shaper circuit, an output buffer, an input buffer, an engine rotation speed sensor, and injector, a switch and a coolant water temperature sensor, respectively. Further, OS designates an operating system which is a basic program for executing scheduling and the like to determine the execution period of each program. This basic program is not directly related to the present invention.

Figure 3:
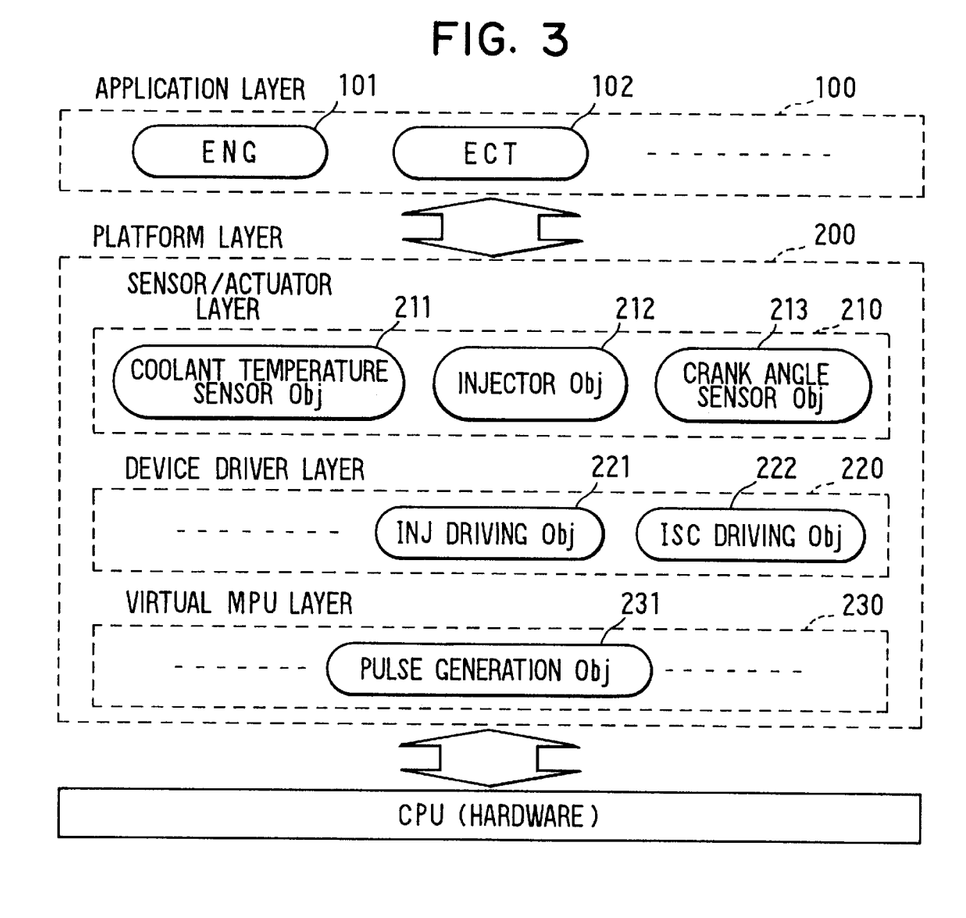
FIG. 3 is an explanatory diagram showing in detail an engine control program structure according to the present invention shown in FIG. 2.
Figure 4A:
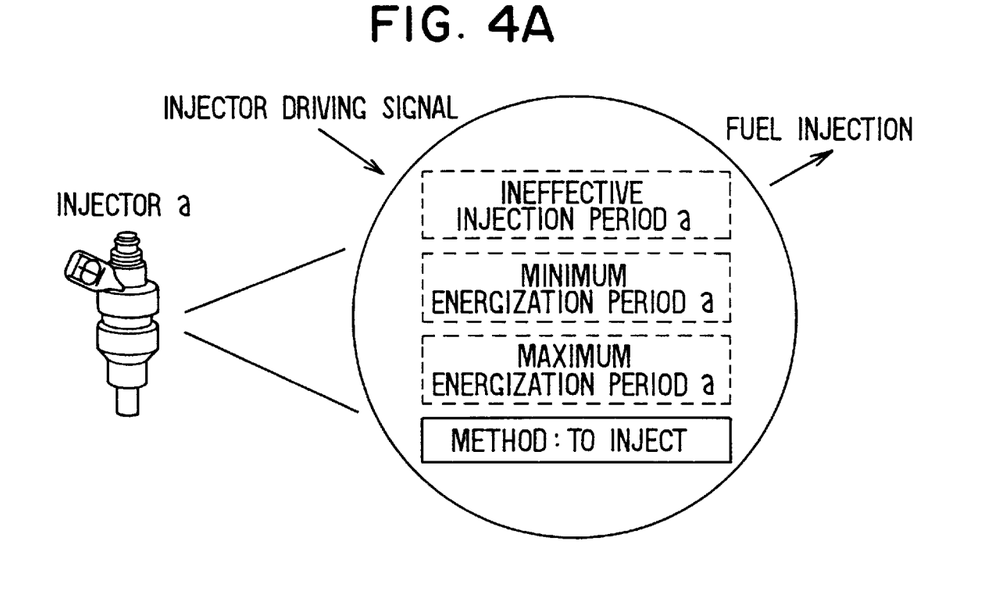
FIGS. 4A and 4B are explanatory views showing behaviors of an injector as an object.
Figure 4B:
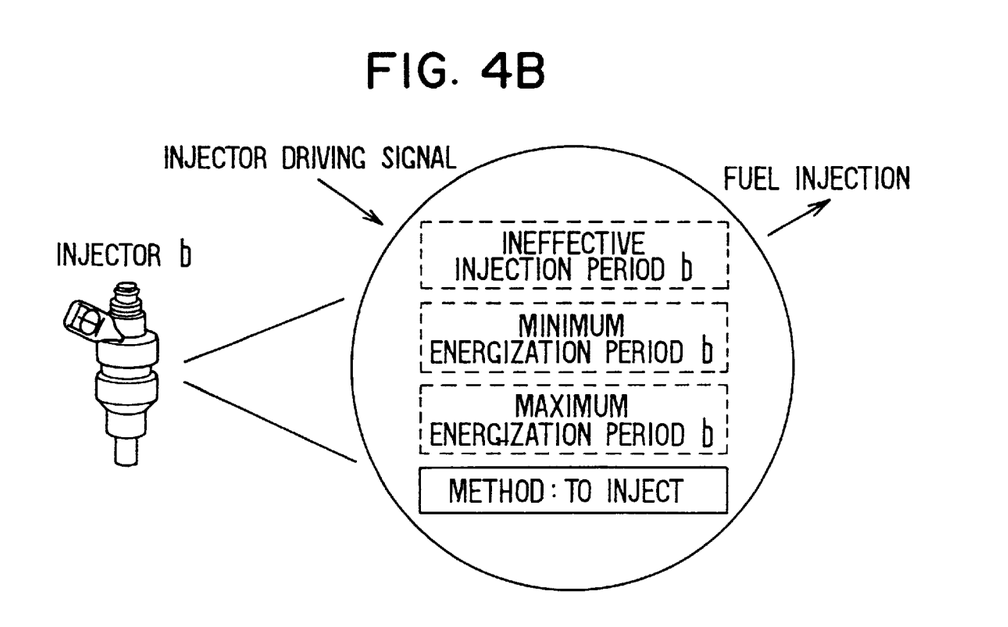

FIG. 3 is an explanatory view showing in detail the structure of the engine control program shown in FIG. 2, and FIGS. 4A and 4B are explanatory views showing the behavior of the injector as an example by way of object. As shown in FIG. 3, the engine control program is constructed with an application layer (AP layer) 100 as the first layer and a platform layer (PF layer) 200 as the second layer.

In the AP layer 100, a program is provided as a control value calculation logic which defines a control content (control value calculation logic) completely independent of the hardware. An ENG object (ENG) 101 for calculating the fuel injection quantity q most optimum for the present engine operating condition, an ECT object (ECT) 102 for issuing a control request to a transmission and the like are provided in the AP layer under a classified condition for each control unit.

Further, in the PF layer 200, programs defining the contents of the system hardware parts such as sensors and actuators, the ECU and the microcomputer are provided. Here, the entire engine control system is taken into consideration, so that the programs may match with the feature of the engine control system, that is, the programs in the AP layer may be used without requiring any changes relative to any possible changes in the hardware constituting the system. For this purpose, the PF layer 200 is divided into three layers, an upper layer, an intermediate layer and a lower layer, based on the following points.

Specifically, as shown in FIG. 2, the upper layer is defined to be the sensor/actuator layer (SA layer) 210 which corresponds to the sensor/actuator layer, the intermediate layer is defined to be the device driver layer (DD layer) 220, and the lower layer is defined to be the virtual MPU layer (VM layer) 230.

The SA layer 210 is for providing each object in the AP layer 100 with the input and output function of the various sensors and actuators required for the engine control. Here exists a plurality of objects (Obj) in which the characteristics and behaviors of the parts are modeled for each part unit, with respect to parts (power train parts) such as the coolant temperature sensor 21, injector 41, crank angle sensor and the like which are located externally of the engine ECU 1 as shown in FIG. 1.

With respect to the injector, for instance, its behavior (method) is to inject fuel. As evident from FIGS. 4A and 4B, the behaviors (injecting) are the same even when the injector a is changed to the injector b. That is, changing the injector corresponds to changing injector characteristics such as the ineffective injection period, minimum energization period, maximum energization period and the like of each injector.

Based on this point, each part is modeled in consideration of its characteristics and the program unit is divided in correspondence with the actual part. Therefore, even when the injector (hardware part) is changed, only the object of the injector (injector object) need be changed and the other programs need not be changed. That is, the characteristics fo the injector (hardware part) itself is information-concealed in the injector Obj (state and behavior of one object is concealed not to be seen from the other objects). Thus, the injector characteristics need not be considered in objects other than the injector.

In the embodiment shown in FIG. 3, the SA layer 210 is shown to include a coolant temperature sensor object (coolant sensor Obj) 211, an injector object (injector Obj) and a crank angle sensor object (crank angle sensor Obj) 213.

In the DD layer 220, the objects modeling the behaviors of the input circuit 2 and the output circuit 4 in the engine ECU 1 shown in FIG. 1 is provided. In this embodiment, an injector driver object (INJ driving Obj) 221 modeling the injector driving circuit 43 and an ISC driver object (ISC driving Obj) 222 modeling the ISC valve driving circuit 44 are shown. The information regarding to the electronic circuit characteristics of the injector driving circuit 43, the I/O mapping (connection between the injector and the microcomputer) and the like are concealed in the INJ driving Obj 221.

Further, the VM layer 230 corresponds to the I/O device of the microcomputer 3, and the structure (architecture) and the characteristics of the microcomputer are concealed therein. Here, a pulse generator object (pulse generator Obj) 231 modeling a pulse generator, which generates a pulse signal for driving the injector 41, is shown. Other objects such as a port object and a pulse input circuit are also provided in addition to the pulse generator Obj 231.

Thus, according to the embodiment of the present invention, the PF layer 200 is divided into three layers of the upper layer, intermediate layer and lower layer in modeling the hardware parts constituting a system in consideration of the entirety of the actual engine control system. As a result, the hardware parts such as the injector, injector driving circuit and the like which have respective life cycles different from each other can be localized. Thus, not only the program changes to the application program but also the program changes to the platform program can be reduced to a minimum relative to changes to the engine control system.

The processing (procedure) executed by the above objects is described next with respect to the injection control processing shown in FIGS. 5–8, as an example.

Figure 5:
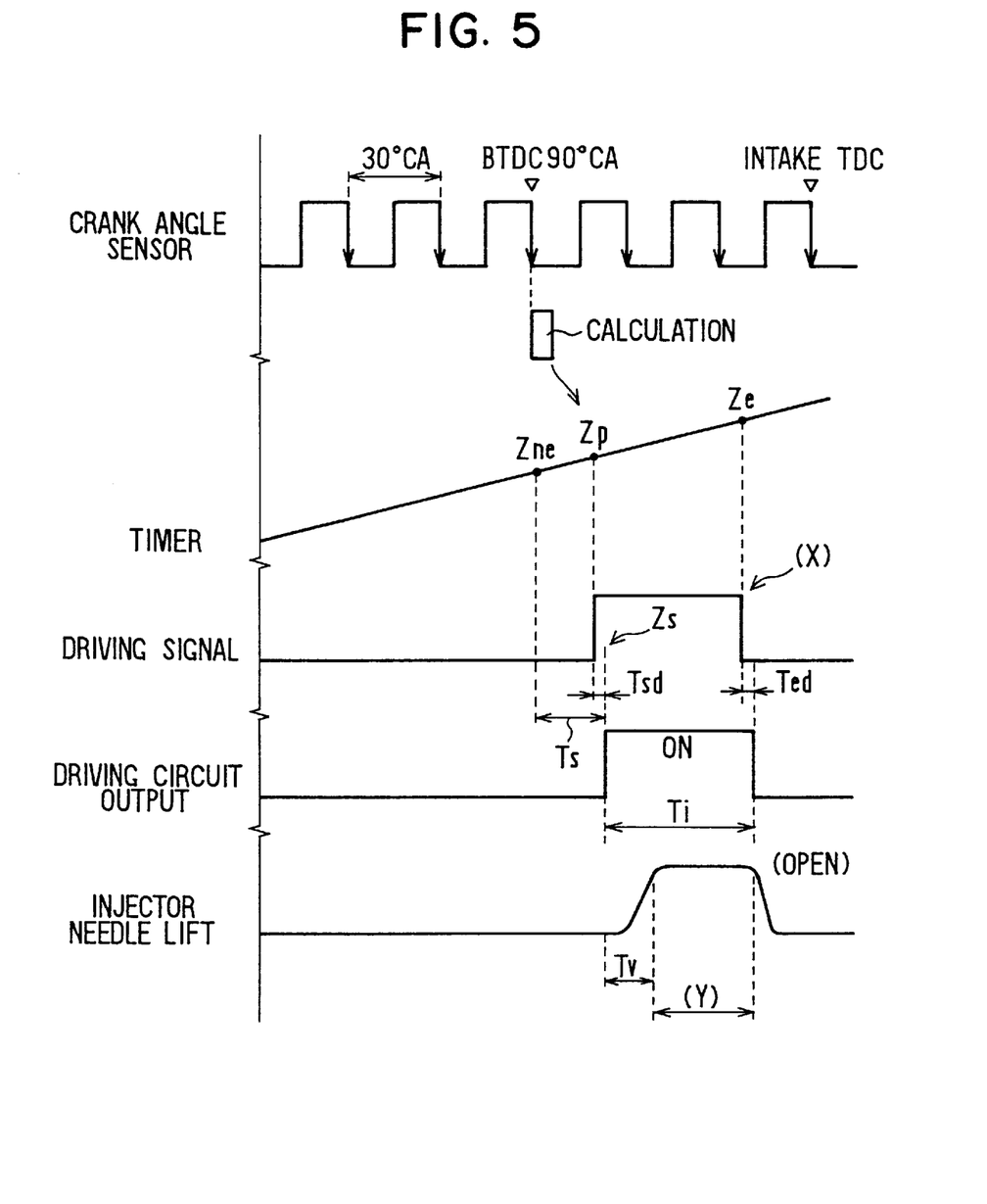
FIG. 5 is a timing diagram showing a general injection control.

FIG. 5 shows a timing diagram showing a general injection control. Although a complicated calculation and processing are executed for setting injection start timings and the like in an actual engine control, such a part is not related to the present invention so much and its description is omitted here for brevity.

In FIG. 5, when a timing (BTDC 90° CA) which is 90° CA (crank angle) before the intake TDC (top dead center) is detected by the crank angle sensor, the injection start timing and the optimum injection quantity are calculated, and an injection start time point Zs and an injection end time point Ze are set in a timer based on the calculated timing and quantity. Thus, when those time points arrive, the microcomputer 3 (pulse generator) generates the driving signal in the waveform (X) of FIG. 5 to drive the injector driving circuit 43. The injector driving circuit 43 supplies the solenoid coil of the injector 41 with electric current to open the needle valve in the injector 41 for fuel injection.

Here, the time period in which the fuel is actually injected is the period (Y) of FIG. 5 relative to the energization period Ti. As evident from the figure, the injection start time point Zs and the like must be set in consideration of a driving delay time Tv of the injector 41 and an operation start delay time Tsd of the driving circuit, so that the injection is effected in the optimum quantity. The driving delay time Tv depends on a time delay from a start of energization of the injector solenoid coil to an actual start of opening of the needle valve, and variations in the hardware characteristics of injectors. The operation start delay time Tsd depends on a time delay from receiving the driving signal from the microcomputer to the turning on of the driving circuit, variations in circuit component parts, and a delay time Ted from the turning off of the driving signal to the turning off of the driving circuit. As described above, those delay times Tv and Tsd varies in dependence on the hardware characteristics of the injector 41 and the injector driving circuit 43.

In the embodiment, those hardware characteristics are concealed, and each hardware (object) is modeled so that a minor program change is only required relative to changes of hardware.

Figure 6:
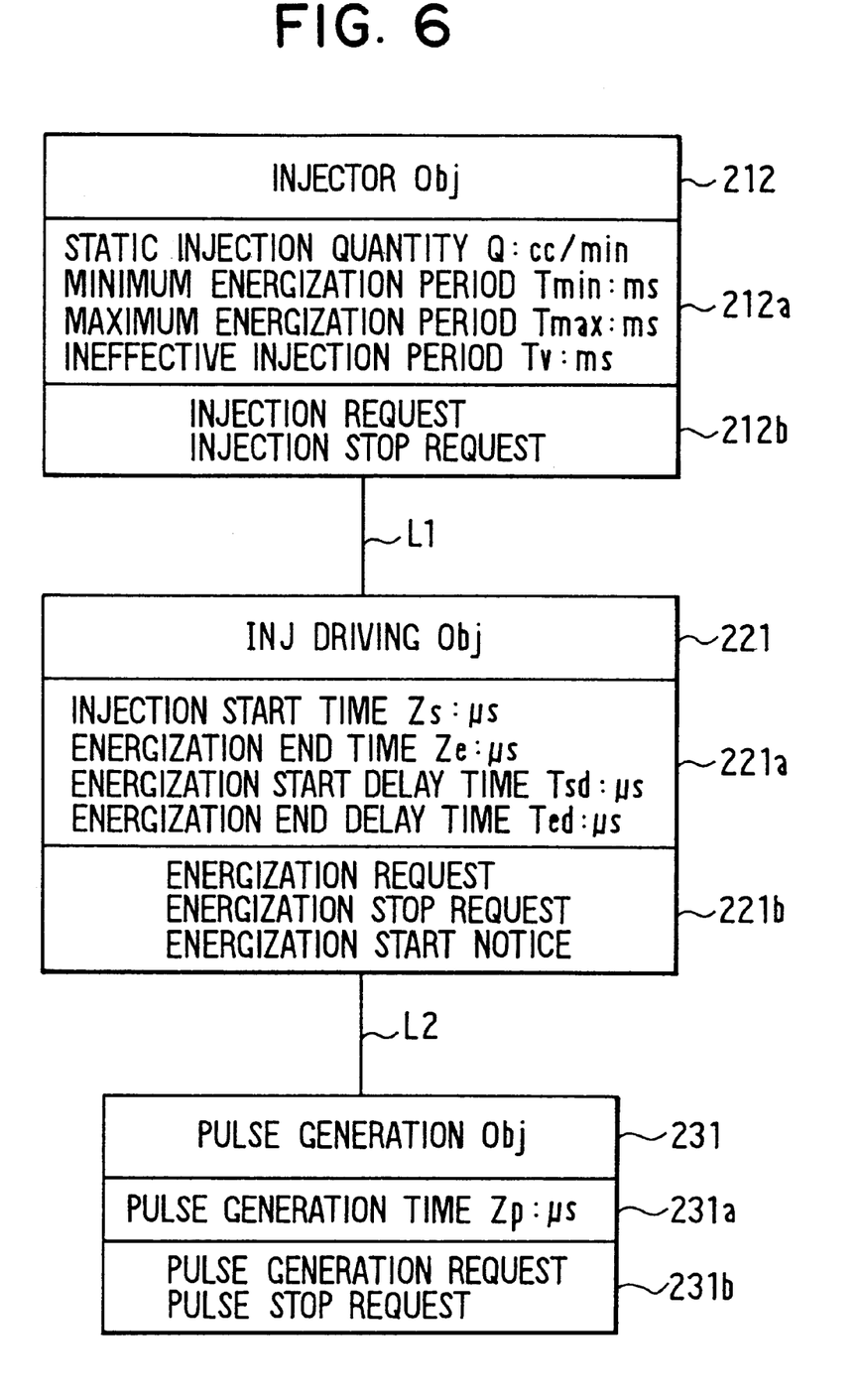
FIG. 6 is a classification diagram showing each model such as an injector object.

FIG. 6 is a classification diagram showing each model of injector objects and the like, which are defined by UML (unified modeling language; a unified method of various definitions used conventionally as modeling languages for object-oriented analyses and designs). Static information of each object can be expressed by those classified diagrams.

As shown by the injector Obj, INJ driving Obj, and pulse generation Obj in FIG. 6 (corresponding to objects 212, 221 and 231 in FIG. 3), the objects are divided into blocks. In each block, the title of the object (212, 221, 231), the data (attribute) (212a, 221a, 231a) and the method (212b, 221b, 231b) are described at the upper part, intermediate part and lower part, respectively. The relation among the blocks are indicated by lines L1 and L2 connecting the blocks.

For instance, the data of the injector Obj 212 include the static injection quantity, minimum energization period and ineffective injection period as shown in 212a. The method includes the injection request and injection stop request.

Figure 7:
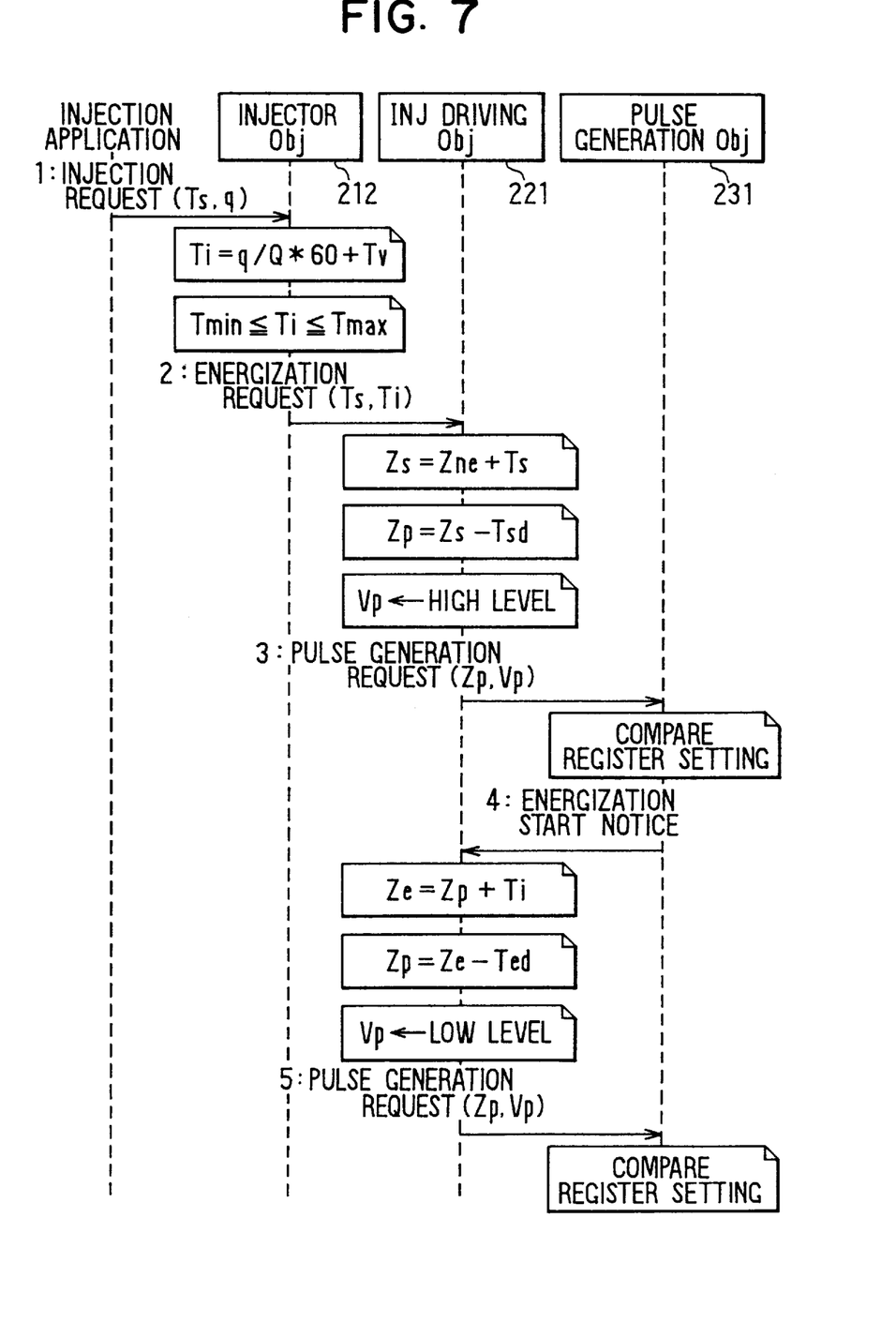
FIG. 7 is a message sequence chart diagram (MSC) showing processing for executing programs modeled as shown in FIG. 6.

FIG. 7 is a message sequence chart diagram (MSC) showing a processing of executing the modeled program of FIG. 6. It shows the processing (method) actually executed in each object, and the arrows indicate issuance of messages to the other objects. Further, FIGS. 8A and 8B are flow diagrams showing an issuance of injection request message from the injection application.

The "1. Injection Request" shown in FIG. 7 is issued as the injection request message (1) from the injection application provided in the ENG object 101 shown in FIG. 3 to the injector Obj 212. This processing is described first with reference to the flow diagrams shown in FIGS. 8A and 8B.

Figure 8A:
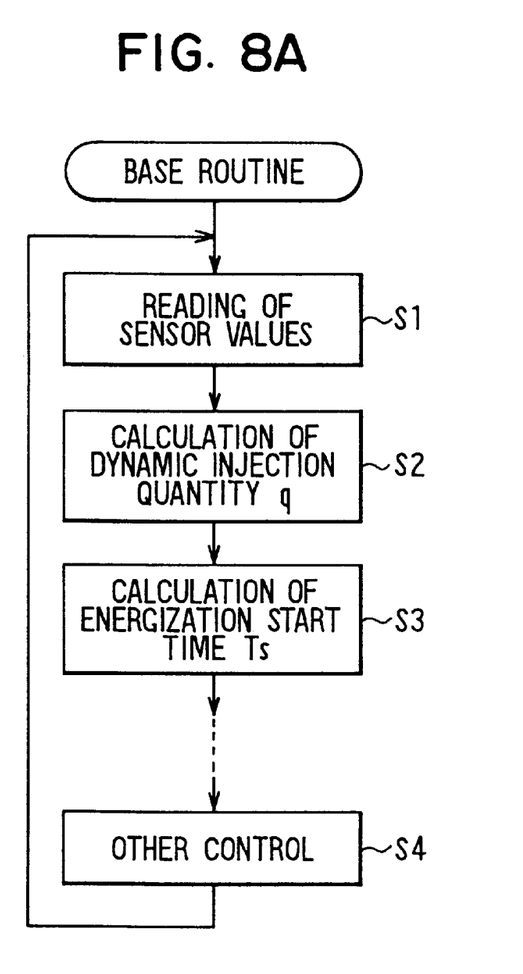
FIGS. 8A and 8B are flow diagrams showing an issuance of injection request message from an injection application.
Figure 8B:
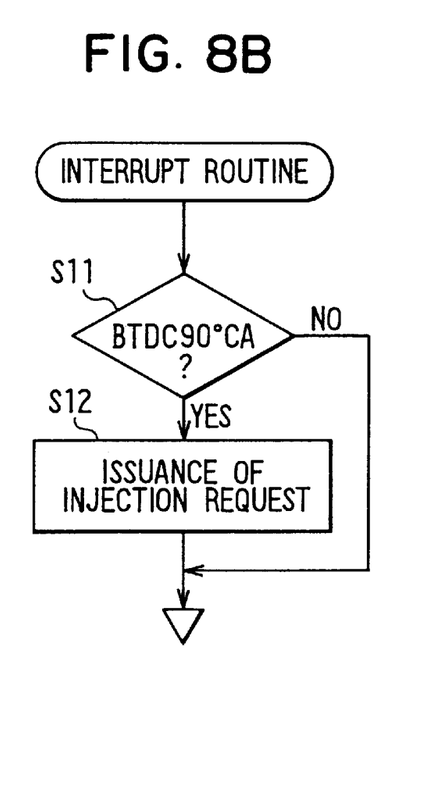

In a base routine shown in FIG. 8A, which is executed every 8 ms, information from the various sensors for detecting engine conditions (detection values) are read (S1), and the dynamic injection quantity q of fuel is calculated (S2). The energization start period Ts is also calculated based on a present battery voltage, because the injection characteristics varies with the battery voltage. After those steps are executed, the processing advances to other non-fuel controls (S4) such as ignition timing control. Thereafter, the base routine is executed again.

In an interrupt routine shown in FIG. 8A, which is executed every 30° CA, as shown in FIG. 5, it is checked (S11) whether the present interrupt timing is a timing (BTDC 90° CA) which is 90° CA before the intake TDC. If so (YES), the injection request message (1) is issued (S12) to the injector Obj 212.

Referring again to FIG. 7, when the injector Obj 212 receives the injection request message (1) from the injection application, the energization period Ti is calculated based on the following equation. This injection quantity q is based on the dynamic injection quantity q sent with the message and takes the characteristics of the injector 41 only into consideration.

$$Ti=(q/Q)\times 60+Tv$$

That is, the delay time until the needle valve opens is taken into consideration by an addition of the ineffective injection period. Here, the energization period Ti is shown as ON of the driving circuit output shown in FIG. 5, and Q indicates the static injection quantity (FIG. 10).

The energization period Ti is guarded within a range ($Tmin \leq Ti \leq Tmax$) from the minimum injection quantity time Tmin and the maximum injection quantity time Tmax, and the energization request message (2) is issued to the INJ driving Obj 221. Here, the minimum injection quantity time Tmin and the maximum injection quantity time Tmax also varies with the mechanical characteristics (hardware characteristics) of the injector 41 such as variations in the lift of the needle valve.

When the INJ driving Obj 221 receives the energization request message, the energization start time point Zs is calculated from the energization start time period Ts shown in FIG. 8A, that is, the time period is converted into the time point. Here, $Zs=Zne+Ts$ as shown in FIG. 5. Further, The final energization start time point Zp is calculated by correcting the energization start time period Zs in consideration of the delay time Tsd of the injector driving circuit 43. Here, $Zp=Zs-Tsd$ as shown in FIG. 5. Then, the pulse generation request message (3) is issued.

When the pulse generation Obj 231 receives the pulse generation request message (3), a compare register (not shown) is set with data so that the microcomputer 3 produces a high level signal (Vp) at the timing of time point Zp. Thus, the microcomputer output becomes high at the time point Zp, so that the injector starts fuel injection. Thereafter, the pulse generation Obj 231 issues an energization start notice message (4) to the injector driving Obj 221.

When the INJ driving Obj 221 receives the energization start notice message (4), the energization end time point Ze is calculated by adding the energization period Ti to the energization start time point Zp, and the final energization start time point Zp is calculated by correcting the energization start time point Ze in consideration of the delay time Tsd of the injector driving circuit 43 (FIG. 5). Then, the pulse generation request message (5) is issued to the pulse generation Obj 231.

When the pulse generation Obj 231 receives the pulse generation request message (5), the compare register is set with data so that the microcomputer 3 produces a low level signal (Vp) at the timing of the time point Zp. Thus, the microcomputer output becomes low at the time point Ze so that the injector ends the fuel injection.

With respect to the injection stop request, energization stop request and pulse stop request in the method of each object (Obj), no detailed description is made here although there are cases in which the injection stop request message is issued for the purpose of fuel cut-off operation.

As described above, only control operations independent of the hardware are executed in the processing of the injection application. Thus, even when the injector 41 and the driving circuit 43 are changed, the processing of calculating the injection quantity q and issuing the injection request message are executed in the same manner. Therefore, it is possible to reuse the program of injection application. That is, the programs in the AP layer 100 such as the injection application are not changed, whatever changes are made to the hardware parts (including parts such as injectors provided externally of the engine ECU 1) constituting the entire engine control system.

Further, even when only the injector 41 is changed, the message to the injector Obj and the message from the injector Obj are not changed. That is, the issuance of the injection request of the injection application or the receipt of the energization request of the INJ driving Obj 221 is not changed. Further, the injection application calculates the injection quantity q and issues information to the injector Obj 212 are also unchanged. Thus, in those instances, only the program of the injector Obj 212 is required to be changed, and the programs of the INJ driving Obj 221 and the like are not required to be changed.

Thus, according to the present embodiment, the program structure adapted to each of the hardware parts which may be changed in the engine control systems can be realized by dividing into three layers, the upper layer being the SA layer 210, the intermediate layer being the DD layer 220 and the lower layer being the VM layer 230. Further, the number of program changes in the PF layer which depends on the hardware is reduced to as small as possible, relative to the input circuit and the driving circuit which are changed comparatively frequently because of differences in the life cycles and the control specifications of the subject engine.

Further, the SA layer 210 has only items such as an injector which convert the electrical signals into the physical quantities, the DD layer 220 has only items which convert the digital signals of the microcomputer into the electrical signals, and the VM layer 230 has only items which generate the digital signals. Thus, as the quality of information in each layer are made uniform, a standard interface can be provided. That is, when the object-oriented designing is applied, the messages which connect objects can be standardized while not limiting to the injection control and the ignition control, so that programming using a template can be attained with ease.

The present invention is not limited to the foregoing embodiment but may be modified in various ways without departing from the spirit of the invention.

What is claimed is:

1. A control apparatus for vehicles comprising:
sensors for detecting operating conditions of a vehicle;
actuators for operating various parts of the vehicle;
an input circuit for receiving detection signals from the sensors;
a microcomputer having a control program, calculating optimum control values based on the conditions of the vehicle in response to signals from the input circuit to generate control signals for driving the actuators; and
a driving circuit for outputting drive signals for driving the actuators in response to the control signals, the sensors, the actuators, the input circuit, the microcomputer and the driving circuit being provided as hardware,
wherein the control program has a first layer defining control value calculation logic which is independent of the hardware and a second layer defining control value calculation logic which is dependent on the hardware, and
the second layer includes a modeled program which defines the physical construction of at least the sensors and the actuators of the hardware by modeling into a corresponding logic construction.

2. A control apparatus for vehicles comprising:
sensors for detecting operating conditions of a vehicle;
actuators for operating various parts of the vehicle;
an input circuit for receiving detection signals from the sensors;
a microcomputer having a control program, calculating optimum control values based on the conditions of the vehicle in response to signals from the input circuit to generate control signals for driving the actuators; and
a driving circuit for outputting drive signals for driving the actuators in response to the control signals, the sensors, the actuators, the input circuits, the microcomputer and the driving circuits being provided as hardware,
wherein the control program has a first layer defining control value calculation logic which is independent of the hardware and a second layer defining control value calculation logic which is dependent on the hardware, and
the second layer is divided into an upper layer defining characteristics and operations of the sensors and the actuators by modeling, an intermediate layer defining characteristics and operations of the input circuit and the driving circuit by modeling, and a lower layer defining characteristics and operations of the microcomputer by modeling.

3. A control apparatus for vehicles comprising:
sensors for detecting operating conditions of a vehicle;
actuators for operating various parts of the vehicle;
an input circuit for receiving detection signals from the sensors;
a microcomputer having a control program, calculating optimum control values based on the conditions of the vehicle in response to the signals from the input circuit to generate control signals for driving the actuators; and
a driving circuit for outputting drive signals for driving the actuators in response to the control signals, the sensors, the actuators, the input circuits, the microcomputer and the driving circuits being provided as hardware,
wherein the control program has a first layer defining control value calculation logic which is independent of the hardware and a second layer defining control value calculation logic which is dependent on the hardware, and
the second layer is divided into an upper layer providing application software existing in the first layer with control information, an intermediate layer converting the control information into digital information for the microcomputer, and a lower layer outputting the digital information.

4. A control apparatus for vehicles as in claim 1, wherein the modeled program is provided as an object-oriented program.

5. A control apparatus for vehicles as in claim 1, wherein the programs existing in each layer are provided as object-oriented program.

6. A control apparatus for vehicles comprising:

a microcomputer having a control program to control each condition of a vehicle;

a group of peripheral circuits for inputting detection data into the microcomputer and outputting control data from the microcomputer; and a group of external parts for inputting detection signals into the peripheral circuits and operating to control each part of the vehicle in response to the control data, wherein the control program has:

a sensor/actuator layer including a program provided as an object-oriented program modeling and defining characteristics and operations of each of the external parts, a device driver layer including a program provided as an object-oriented program modeling and defining characteristics and operations of the circuits, and a virtual MPU layer including a program provided as an object-oriented program modeling and defining characteristics and operations of the microcomputer.

7. A control apparatus for vehicles as in claim 6, wherein the external parts include sensors and actuators.

8. A control apparatus for vehicles as in claim 6, wherein the peripheral circuits include at least an A/D conversion circuit, a waveform shaper circuit and an injector driving circuit.

9. A control apparatus for vehicles as in claim 6, wherein the control program further includes an application layer which is independent of hardware, and the application layer is provided to receive various control information form the sensor/actuator layer.

10. A control apparatus for vehicles comprising:

sensors for detecting operating conditions of a vehicle;

actuators for operating various parts of the vehicle;

an input circuit for receiving detection signals from the sensors;

a microcomputer having a control program, calculating optimum control values based on the conditions of the vehicle in response to signals from the input circuit to generate control signals for driving the actuators; and a driving circuit for outputting drive signals for driving the actuators in response to the control signals, the sensors, the actuators, the input circuits, the microcomputer and the driving circuits being provided as hardware, wherein the control program has a first layer defining control value calculation logic which is independent of the hardware and a second layer defining control value calculation logic which is dependent on the hardware, and the second layer includes, for each hardware part, a plurality of programs which are provided as object-oriented programs to hide hardware characteristics of the sensors and the actuators, for each hardware part.

11. A control apparatus for vehicles as in claim 10, wherein the hardware characteristics include at least one of: (i) an ineffective injection period, (ii) a minimum energization period and (iii) a maximum energization period of an injector.

* * * * *